Patented Aug. 22, 1944

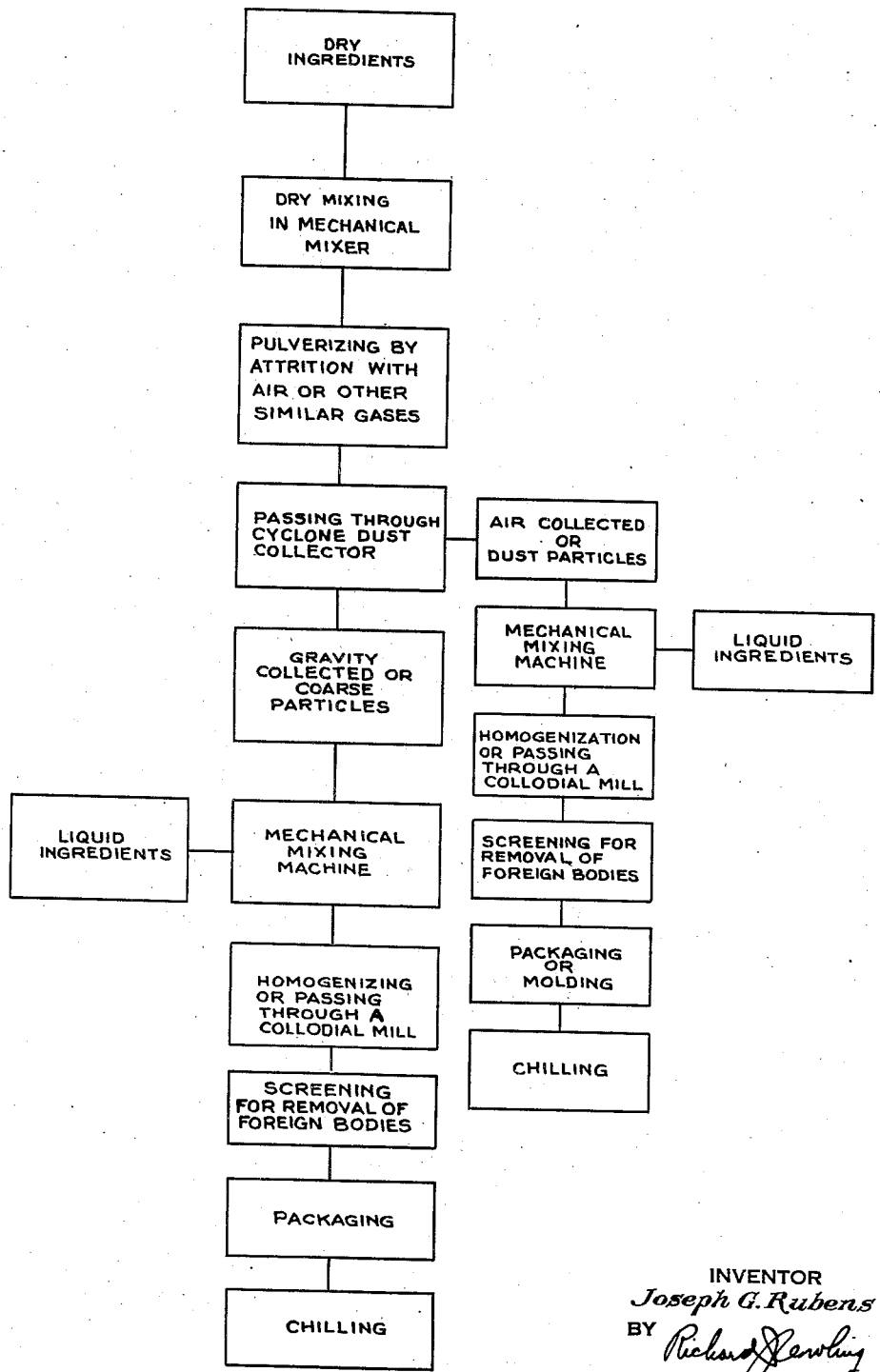

2,356,181

UNITED STATES PATENT OFFICE 2,356,181

CHOCOLATE MANUFACTURE

Joseph G. Rubens, New York, N. Y., assignor to Joe Lowe Corporation, New York, N. Y., a corporation of Delaware Application March 31, 1942, Serial No. 437,014

10 Claims. (Cl. 99—23)

The present invention relates generally to a new and improved method of making chololate products, and it has specific relation primarily to the manufacture of chocolate dipping coating materials of the type used by confectioners from cocoa powder and other essential ingredients.

Heretofore, the manufacture of chocolate dipping coatings from cocoa powder was a laborious, expensive and time consuming process, which involved the use of several kinds of very expensive and heavy machines, such as melangeurs, ramolliseuse, calenders, etc. These machines and the processes used in connection therewith require considerable floor space, the expenditure of much operating power, and milling operations requiring long periods of time to produce a satisfactory coating material. All of these numerous disadvantages have been obviated by the present invention, whereby a very superior type of dipping coating material may be produced from cocoa powder and the other essential ingredients in a relatively short period of time and at a great savings in space, labor and power.

An object of the present invention is to provide a new and improved method of making a liquid chocolate dipping coating material of high quality in which a complete blending of the various ingredients may be obtainable.

A further object of the invention is the provision of a new and improved method of manufacturing chocolate dipping coating material economically and efficiently within a relatively short period of time as compared to present day conventional practices.

Another object of the invention is to provide a cheap and inexpensive method of manufacturing chocolate dipping coating material with a minimum of equipment and without employing the laborious milling operations which involve the use of melangeurs, ramolliseuses, calenders, etc.

A further object of the invention is the provision of a new and improved method of manufacturing solid chocolate products of the type used in making candy, baking, etc., economically and efficiently within a relatively short period of time as compared to present day conventional practices.

Various other and further objects and advantages of the invention, which result in economy and efficiency, will be apparent from the following detailed description of the method employed and apparatus used, reference being had to the accompanying drawing, forming a part hereof, in which the several steps of my process are diagrammatically illustrated.

Liquid chocolate dipping coating material is used generally in coating ice cream products by momentarily dipping or immersing the same therein to provide them with a thin hard outer protective coating at below normal room temperatures. The coatings made in accordance with this invention remain in liquid form at substantially normal room temperatures, but such conventional coatings generally have been hard or solid at such temperatures and required breaking and melting to reduce them to liquid form suitable for use as a dipping coating. Coating materials of this character have approximately from 53% to 63% total fat, which total fat includes its natural cocoa butter and the fats and oils which have been added during the process of manufacture; between 30% to 45% sugar; between 1% to 20% milk solids, such as, for example, skim milk powder, whole milk powder, etc.; $\frac{1}{10}$% to 1% lecithin; from 0% to 1% flavor, salt, vanillin and coumarin; and the balance consists of cocoa powder. Of course, it will be obvious to one skilled in the art that the exact proportions of each ingredient is dependent entirely upon the final flavor, texture, color and quality desired. It is impossible to set forth in detail the exact proportions of ingredients to be used in any one instance, because the final product must be judged entirely by its texture, taste, flavor, color, quality, etc., which are variables dependent entirely upon the senses of the individual testing the same. However, the proportions given above are the minimum and maximum quantities that could be used in manufacturing a liquid chocolate coating material having the essential characteristics required by the trade at the present time.

In carrying out my improved process the dry cocoa powder, crystalline or other dry forms of sugar, milk solids and salt, which shall hereinafter be collectively referred to as the "dry ingredients," are mixed together in a dry state in any suitable type of mechanical mixer which is capable of accomplishing the desired result of making a complete admixture of these several ingredients. It has been found that ultra fine cocoa powder, sugar, milk solids and salt give no superior advantages whatsoever, and that the coarser grained these ingredients are, within of course reasonable limits, the more satisfactory they will perform in my process. This is an important advantage because ultra fine ingredients invariably cost more than the coarser grades, which means that the inexpensive grades may be employed without difficulty in my process.

After all of the basic dry ingredients, such as, for example, cocoa powder, sugar, milk solids, salt, etc., have been combined into an admixture, the admixture is now ready to be pulverized. I have found that the necessary pulverization may be accomplished preferably by passing the admixture through a conventional air or other fluid type pulverizer instead of through the conventional milling operations requiring the use of a melangeur, ramolliseuse, calender, etc. The conventional air type pulverizer, of which there are many kinds available on the market, employs induced fluidal currents or similar effects in such a manner as to produce a reduction of the particles of material to the desired degree substantially by attrition and abrasion of the particles against one another with the fluid acting as a reducer and also as a conveyor of the reduced particles. The particle size to which these ingredients must be reduced is such that 99% of them will pass through a 325 mesh screen while the balance or remaining 1% of them will pass through a 100 mesh screen.

This impalpably fine pulverized admixture is now passed into a conventional cyclone type dust collector. There are many suitable types of dust collectors on the market, but the size utilized must be such as to remove only certain particles from the admixture. The size used must have a capacity equivalent to one of conical shape having a diameter at its top of 48 inches, and being 114 inches high, and having a rated capacity of approximately 1200 cubic feet of air per minute. In this particular size collector the air intake is approximately 84 square inches in size, and the outlet is approximately 29 square inches in size, the air intake, therefore, being about three times the size of the air outlet. In passing the impalpably fine admixture through such a separator a great majority of the finely divided particles will be gravitated out of the air stream, which particles I shall hereinafter designate as the "coarse particles" or the "gravity collected particles," and the balance, consisting of the "ultra fine particles" or "air borne particles," which particles for convenience will hereinafter be called "dust," will be carried off by the air stream from which they must be collected by use of a suitable dust bag. With a cyclone dust collector of the size indicated, I have found that it operates efficiently, handling between 200 and 600 pounds of the dry ingredients per hour, and that the dust collectable from such an operation will weigh from between 2% and 5% of the total amount of material passed through the collector. From the foregoing description it will be obvious to anyone skilled in the art that a dust collector of the exact size mentioned need not be used, but that, if any other size is to be employed, suitable calculations must be made to determine the rate of flow necessary in such cases to remove only the equivalent "dust" from such finally ground material. Such computations are, however, well within the skill of those engaged in the dust collecting art, and therefore need not be tabulated herein. The individual particles forming the dust are of such a degree of fineness that they are incapable of measurement by any ordinary measurement standards. The dust is removed from the ground admixture, and, insofar as the manufacture of a liquid chocolate dipping coating is concerned, is discarded. This dust, however, may later be separately used in making other types of chocolate products, such as, for example, solid chocolates, slab coatings, and the like.

The coarser particles, which are those collected by gravity from the cyclone separator, are now placed into a suitable mechanical mixing device of any conventional type, and, while being agitated in this mixer, the desired amounts of the necessary liquid ingredients, such as, for example, lecithin, oil and flavor, are added. The oil in making such a product may be any suitable vegetable oil such as, for example, cocoanut, babasu, peanut oil, sesame, or combinations thereof, etc. These amounts may vary within the limits aforementioned, and they cannot be given exactly for making any specific type or grade of chocolate dipping coating material because no standards are followed in connection with such a product. The dipping coating materials are tested by smell, taste, texture, color and flavor, and manifestly the amounts of each ingredient used is dependent to a certain degree upon the senses of the operator or tester.

After the dry ingredients and the liquid ingredients are completely mixed so that the dry ingredients are in complete suspension within the liquid ingredients, the resulting product is a viscous liquid having an appearance, smell, taste, texture and viscosity substantially like that of the final chocolate dipping coating material. This resulting liquid product is now passed through a conventional colloidal mill, or homogenized, whereby the product is broken up and each of the small individual particles of the dry ingredients are further dispersed and uniformly suspended in the liquor so that ordinarily no settling or seperation will take place in the final product if the same has been handled and stored under conditions recognized by the trade as being ideal for this type of product.

After the step of homogenization is complete, it has been found desirable to give the resulting chocolate liquid dipping coating material a screening for the removal of any foreign bodies that may have fallen therein during the process of manufacture.

After screening for the removal of foreign bodies, the liquid chocolate dipping coating material is finished and ready to be packaged. The most practical package is a metal drum, barrel or other suitable liquid container capable of being tightly sealed from the surrounding atmosphere. Vacuum sealing, while desirable, is not essential.

When sealed the packages are placed generally in a storage room which is maintained at a chilling temperature of approximately 45° F. This chilling tends to thicken the liquid material approximately to the consistency of butter or lard, thereby facilitating handling and preventing loss through leakage in transit. It is not essential, however, to chill the product in order to preserve it, but chilling does nevertheless increase its keeping qualities considerably.

The dust particles, which were those carried off by the air of the separator or dust collector, are perfectly edible and suitable for making candy chocolate slabs, solid slab chocolate for domestic uses such as baking, etc. If these dust particles were to be made up into a liquid having the same viscosity as the liquid dipping chocolate material made with the gravity collected particles, the final product would be off-texture, off-color, off-taste, etc., making it unsuitable for a dipping coating for ice cream and similar products. However, when these ultra-fine particles are left in the dry admixture used in making my liquid dipping chocolate coating material they seriously affect the fluidity of the final product by increasing its viscosity, making it inferior as a coating material. This inferiority cannot be corrected by increasing the amount of oil, etc., or by other changes in the formula. I believe this inferiority is due to the fact that all of the particles remain in suspension in the coating liquor, and that these ultra fine particles, having a greater surface area per unit of weight than the larger gravity collected particles, tend to absorb too much oil, i. e., the oil tends to cling to its increased surface area to such an extent that there is insufficient fluid oil in the final product.

This dust, as shown in the drawing, may be used separately to make a candy chocolate or slab or solid chocolate material suitable for sale as baking coatings, slab coating, etc. In making such a solid chocolate product, the dust particles are placed in a mechanical mixer such as is used in connection with the manufacture of the liquid dipping coating, and, while in said mixer, the desired amounts of the liquid ingredients such as oil, lecithin and flavor are added. The combined dry and liquid ingredients are mixed thoroughly until the dust particles are substantially in complete suspension. The resulting liquid is now ready to be run through a colloidal mill for purposes of homogenization. It is then screened to remove any foreign bodies that may have fallen in during the manufacturing operations. After screening, it is ready to be packaged, or placed in molds, and chilled preparatory to shipping. This slab or solid chocolate product may be broken up or ground and used in that manner, or may be heated to cause it to return to a liquid state for convenience in using.

It is also recognized that the aforementioned process may be followed in making a superior solid chocolate product without separating any of the dust particles from the ground dry ingredients. In such solid chocolate product, it will be necessary, of course, to effect the proper balance of the dry and liquid ingredients to produce a product which is solid and form-retaining at room temperatures. This balance is well within the knowledge of one skilled in the art, and no further explanation need be given herein.

Although I have only described and illustrated in detail one form which the invention may assume, it will be apparent to those skilled in the art that the invention is not so limited, but that various modifications may be made therein without departing from the spirit thereof or from the scope of the appended claims.

What I claim is:

1. In the art of preparing a chocolate material of the character described, the steps of grinding the dry ingredients consisting of cocoa, sugar and salt in a dry state to an impalpably fine degree, removing the ultra fine dust particles therefrom, and then combining the dry powdery admixture with the required liquid ingredients consisting of a suitable vegetable oil to form a product of the desired flavor, texture, color and taste.

2. In the art of preparing a liquid dipping chocolate coating material of the character described, the steps of grinding the several dry ingredients consisting of cocoa, sugar, salt and milk powder by attrition to a degree of impalpable fineness, removing the ultra fine dust particles therefrom, and then combining the remaining dry powdery admixture with the proper proportions of liquid ingredients consisting of a suitable vegetable oil and flavor to form a liquid dipping chocolate of the desired flavor, texture, color and taste.

3. In the art of preparing a liquid dipping chocolate coating material of the character described, the steps of grinding the dry ingredients consisting of cocoa, sugar and salt in a dry state by attrition and abrasion to an impalpably fine degree whereby 99% will pass through a 325 mesh screen and the remaining 1% will pass through at least a 100 mesh screen, separating by means of an air current the ultra fine dust particles therefrom, and then combining the remaining powdery admixture with the proper proportions of liquid ingredients consisting of a suitable vegetable oil and flavor to form a liquid dipping chocolate of the desired flavor, texture, color and taste.

4. In the art of preparing a liquid dipping chocolate coating material of the character described, the steps of grinding the dry ingredients consisting of cocoa, salt, sugar and milk powder in a dry state by attrition and abrasion to an impalpably fine degree whereby 99% thereof will pass through a 325 mesh screen, and the remaining 1% will pass through at least a 100 mesh screen, removing the ultra fine dust therefrom, combining the remaining powdery admixture with the proper proportions of liquid ingredients consisting of a suitable vegetable oil, lecithin and flavor necessary to form a liquid dipping chocolate material of the desired flavor, texture, color and taste, and then homogenizing the resultant liquid product to disperse the individual particles of the powdery admixture into permanent suspension in said liquid to provide a non-separating dipping chocolate coating material.

5. The process of making a non-settling liquid dipping chocolate coating material of the character described which comprises the steps of combining the cocoa powder, sugar, milk solids and salt into a dry admixture, grinding said admixture by attrition to a degree of impalpable fineness, removing the ultra fine dust particles therefrom, adding sufficient quantities of oil, lecithin and flavor to said remaining dry powdery admixture to form a liquid of the desired flavor, texture, color and taste, and mixing the same thoroughly to suspend said particles in said liquid to form a non-separating dipping chocolate coating material.

6. The process of making a non-settling liquid dipping chocolate coating material of the character described which comprises the steps of combining the cocoa powder, sugar, milk solids and salt into a dry admixture, air grinding said admixture by attrition to a degree of impalpable fineness, removing with an air current the ultra fine dust particles therefrom, adding sufficient quantities of oil, lecithin and flavor to said remaining dry powdery admixture to form a liquid of the desired color, texture, flavor and taste, and homogenizing the same thoroughly to suspend said individual particles in said liquid to form a non-separating chocolate dipping coating material.

7. The process of making a non-settling liquid dipping chocolate coating material of the character described which comprises the steps of combining the dry cocoa powder, sugar, milk solids and salt into an admixture, air grinding said admixture by attrition to an impalpably fine degree whereby 99% will pass through a 325 mesh screen and the remaining 1% will pass through at least a 100 mesh screen, separating the ultra fine dust particles from said ground mixture, adding sufficient quantities of oil, lecithin and flavor to said remaining dry powdery admixture to form a liquid of the desired flavor, texture, color and taste, and homogenizing the same to disperse the individual particles in said liquid in complete suspension to form a non-separating dipping chocolate coating material.

8. The process of making a non-settling liquid cholocate dipping coating material of the character described which comprises the steps of combining the dry cocoa powder, sugar, milk solids, and salt into an admixture, air grinding said admixture by attrition to an impalpably fine degree whereby 99% will pass through a 325 mesh screen and the remaining 1% will pass through at least a 100 mesh screen, removing the ultra fine dust particles from said ground mixture by circulating the same in a current of air, adding sufficient quantities of oil, lecithin and flavor to said remaining dry powdery admixture to form a liquid of the desired flavor, texture, color and taste, and homogenizing the same to disperse the individual particles in said liquid in complete suspension to form a non-separating dipping chocolate coating material.

9. The process of making a non-settling liquid chocolate dipping coating material of the character described which comprises the steps of combining the dry cocoa powder, sugar, milk solids and salt into an admixture, air grinding said admixture by attrition to an impalpably fine degree whereby 99% will pass through a 325 mesh screen and the remaining 1% will pass through at least a 100 mesh screen, removing the ultra fine dust particles from said ground mixture, adding sufficient quantities of oil, lecithin, and flavor to said remaining dry powdery admixture to form a liquid of the desired flavor, texture, color and taste, and passing the same through a colloidal mill to disperse the individual particles in complete suspension in said liquid to form a non-separating chocolate dipping coating material.

10. The process of making a non-settling liquid chocolate dipping coating material of the character described which comprises the steps of combining the dry cocoa powder, sugar, milk solids and salt into an admixture, air grinding said admixture by attrition to an impalpably fine degree whereby 99% will pass through a 325 mesh screen and the remaining 1% will pass through at least a 100 mesh screen, removing the ultra fine dust particles from said ground mixture by circulating the same in a current of air, adding sufficient quantities of oil, lecithin and flavor to said remaining dry powdery admixture to form a liquid of the desired flavor, texture, color and taste, and passing the same through a colloidal mill to disperse the undissolved particles into complete suspension in said liquid to form a non-separating chocolate dipping coating material.

JOSEPH G. RUBENS.